US009025902B2

United States Patent
Schutz et al.

(10) Patent No.: US 9,025,902 B2
(45) Date of Patent: May 5, 2015

(54) POST-RENDER MOTION BLUR

(71) Applicant: Lucasfilm Entertainment Company, Ltd., San Francisco, CA (US)

(72) Inventors: Victor Schutz, Novato, CA (US); Patrick Conran, Corte Madera, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 34 days.

(21) Appl. No.: 14/036,664

(22) Filed: Sep. 25, 2013

(65) Prior Publication Data

US 2015/0084991 A1   Mar. 26, 2015

(51) Int. Cl.
- G06K 9/40 (2006.01)
- G06T 5/00 (2006.01)
- G06T 13/80 (2011.01)

(52) U.S. Cl.
CPC ............... G06T 5/002 (2013.01); G06T 13/80 (2013.01)

(58) Field of Classification Search
USPC .............. 382/107, 167, 236, 254, 255, 275
See application file for complete search history.

(56) References Cited

U.S. PATENT DOCUMENTS

2004/0189662 A1* 9/2004 Frisken et al. ............... 345/611
2010/0149184 A1* 6/2010 Pepper et al. ............... 345/426

* cited by examiner

*Primary Examiner* — Phuoc Tran
(74) *Attorney, Agent, or Firm* — Kilpatrick Townend & Stockton LLP

(57) ABSTRACT

A method of applying a post-render motion blur to an object may include receiving a first image of the object. The first image need not be motion blurred, and the first image may include a first pixel and rendered color information for the first pixel. The method may also include receiving a second image of the object. The second image may be motion blurred, and the second image may include a second pixel and a location of the second pixel before the second image was motion blurred. The method may additionally include locating the first pixel in the first image using the location of the second pixel before the second image was motion blurred. The method may further include coloring the second pixel using the rendered color information for the first pixel.

20 Claims, 10 Drawing Sheets

POST-RENDER MOTION BLUR

BACKGROUND

The term motion blur is used to describe the visual streaking effect of moving objects in a still image. In traditional photography, motion blur is the effect of an image changing its position as it is being recorded due to rapid movement that is faster than the shutter exposure time. In computer animation, two-dimensional images can be rendered from three-dimensional models in order to generate successive frames for a movie or video game. In contrast to a physical photograph, computer rendered images can capture a single instant in time, and thus motion blur need not be a part of rendered images. However, without the simulated effect of motion blur, the animation of still images tends to produce movements that seems choppy and segmented to the human eye. For example, computer animation without motion blur can tend to resemble traditional stop-action animation where the model's position is changed between each frame. In order to produce more realistic animations, a motion blur effect can be added by the renderer as each frame is generated. This can have the effect of smearing the still images in each frame according to a direction of motion.

BRIEF SUMMARY

In one embodiment, a method of applying a post-render motion blur to an object may be presented. The method may include receiving a first image of the object. The first image need not be not motion blurred, and the first image may include a first pixel and rendered color information for the first pixel. The method may also include receiving a second image of the object. The second image may be motion blurred, and the second image may include a second pixel and a location of the second pixel before the second image was motion blurred. The method may additionally include locating the first pixel in the first image using the location of the second pixel before the second image was motion blurred. The method may further include coloring the second pixel using the rendered color information for the first pixel.

In some implementations, the second image further may include occlusion information indicating whether the second pixel is visible to a camera location when rendering the second image. The method may also include determining that the occlusion information exceeds a threshold amount for the second pixel in the second image, rendering a third image of the object that includes color and motion blur for the object at the second pixel, and using at least a portion of the third image to color the second image. The first image may be a beauty render image. The second image may be an effects holdout image. The second image need not include rendered color information. The second pixel may include a plurality of samples. The location of the second pixel before the second image was motion blurred may include a plurality of locations corresponding to the plurality of samples. Locating the first pixel in the first image may include locating each of the plurality of samples in the first image. Coloring the second pixel using the rendered color information for the first pixel may include coloring each sample in the second pixel using a color from the first image, and compositing the plurality of samples to calculate a color for the second pixel. The method may additionally include receiving a third image of the object. The third image may be motion blurred, and may include pixel location information prior to being motion blurred. The second image may be rendered using a first camera position; the third image may be rendered using a second camera position, and coloring the third image using the first image. The second image and the third image may be stereo images for a three-dimensional presentation.

In another embodiment, a computer-readable memory may be presented. The computer-readable memory may comprise a sequence of instructions which, when executed by one or more processors, causes the one or more processors to apply a post-render motion blur to an object. The instructions may cause the processor(s) to receive a first image of the object. The first image need not be motion blurred, and the first image may include a first pixel and rendered color information for the first pixel. The instructions may also cause the processor(s) to receive a second image of the object. The second image is motion blurred, and the second image may include a second pixel and a location of the second pixel before the second image was motion blurred. The instructions may additionally cause the processor(s) to locate the first pixel in the first image using the location of the second pixel before the second image was motion blurred. The instructions may further cause the processor(s) to color the second pixel using the rendered color information for the first pixel.

In yet another embodiment, a system may be presented. The system may include one or more processors and a memory communicatively coupled with and readable by the one or more processors. The memory may comprise a sequence of instructions which, when executed by the one or more processors, cause the one or more processors to apply a post-render motion blur to an object. The instructions may cause the processor(s) to receive a first image of the object. The first image need not be motion blurred, and the first image may include a first pixel and rendered color information for the first pixel. The instructions may also cause the processor(s) to receive a second image of the object. The second image is motion blurred, and the second image may include a second pixel and a location of the second pixel before the second image was motion blurred. The instructions may additionally cause the processor(s) to locate the first pixel in the first image using the location of the second pixel before the second image was motion blurred. The instructions may further cause the processor(s) to color the second pixel using the rendered color information for the first pixel.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In computer animation, generating motion blurred images can be part of the rendering process. Thus, adding motion blur to an image can be done natively in a renderer. For example, rendering with motion blur can be done in a ray casting renderer such as Arnold®. While adding motion blur natively in the renderer will generally produce the best images, there are some significant drawbacks. Motion blur in the renderer is very time intensive, especially for highly specular or reflective scenes (e.g. wet environments) or scenes with other types of visual effects, such as smoke, dust, steam, water spray, and/or the like. To achieve an acceptable sampling noise, the sampling—or number of rays cast in each pixel—has to be increased to a level that causes the render times to be prohibitively long. In some cases, an acceptable noise level cannot be achieved at all.

Instead of performing a motion blur in the renderer, another option is to perform a post-render motion blur. Previously, the approaches taken in these cases include using a two-dimensional vector blur. A motion vector pass can be rendered that stores a vector for each pixel that indicates the average direction that the geometry within that pixel is traveling. Then, a vector blur process typically smears each pixel along the direction indicated by the stored vector. The motion vector pass by the renderer that generates the motion vectors typically takes a small amount of time compared to generating a motion blur effect in the renderer. Therefore, a post-render motion blur can save significant processing time, as the smearing operation can be performed after the image is rendered.

Although motion vector blurring is faster, it is susceptible to a number of problems that have become more pronounced as computer animations have become more complex and CGI characters have become more detailed and pervasive in each scene. The time advantages gained by vector blur tend to disappear if there is a lot of movement in an image and each pixel has to be smeared along a long motion line. More problematically, vector blur can generate inaccurate results when overlapping geometry yields conflicting motion vectors. In other cases, occluded geometry cannot be resolved, leading to artifacts at the geometry boundaries. Finally, vector blurred edges typically do not line up with other render elements, such as effects holdouts for water spray, fog, mist, rain, etc.

The embodiments described herein can be used to perform a post-render motion blur process that is more efficient and offers more accurate results than the vector blurring process described above. For example, a renderer can provide a first image that includes all of the rendered color information for an object, as well as a second image that includes a limited amount of information, such as position information for the object. The second image may typically be used for an effects holdout, and may be referred to as a deep image that includes depth and opacity information for each sample for each pixel. Additional information can be added to the second image that describes the position of the geometry represented by each pixel prior to the motion blur performed by the renderer. This location information can be used to find the correct color in the first image, and the second image can be colored based on the colors of the first image. A method for correcting for occluded geometry is also described, as well as a method for generating stereo 3-D images using two cameras.

Figure 1A:
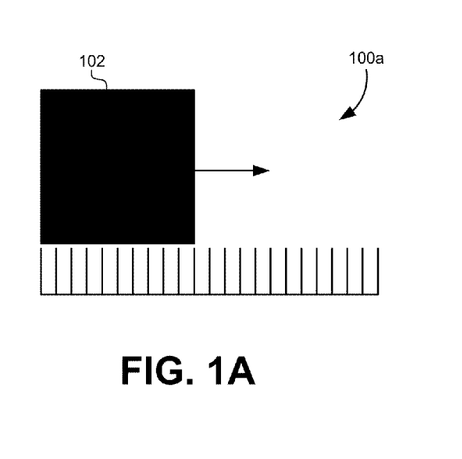
FIGS. 1A-C illustrate a motion blur being added to a moving object, according to some embodiments.
Figure 1B:
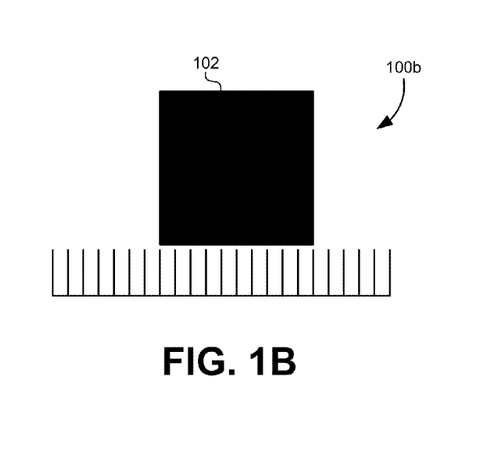
Figure 1C:
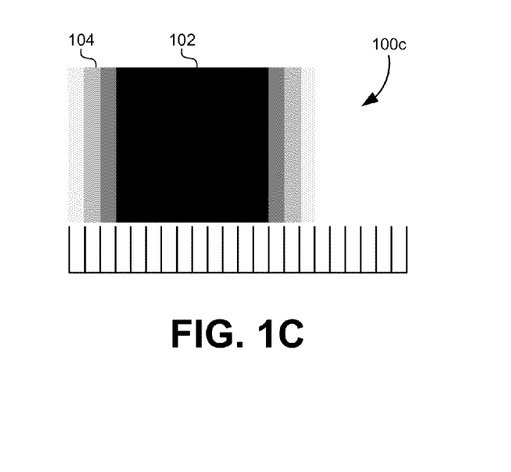

FIGS. 1A-1C illustrate a motion blur being added to a moving object, according to some embodiments. In this simple example, a block 102 moves from left to right through successive image frames. The position of the block 102 in image 100a of FIG. 1A may represent a starting position, while the position of the block 102 in image 100b of FIG. 1B may represent an ending position. Using a traditional post-render motion blur operation, the still image in each frame generated by the renderer would not include motion blur effects, and would thus resemble the block 102 in images 100a and 100b. These images do not include motion blur effects, but do include color, lighting effects, textures, and/or the like, and may be referred to as a "beauty image" or a "beauty pass."

To perform a post-motion blur using vectors, the renderer could produce an additional image that includes a pass of vectors. For example, the red channel could indicate how far a pixel moves from left to right between subsequent frames, while the green channel could indicate how far pixel moves up and down between subsequent frames. The compositing software that is traditionally executed after the renderer can use the directional vectors provided by the vector paths to smear or blur each frame based on the direction of the motion vectors. For example, FIG. 1C may represent a still image between image 100a and image 100b. The beauty image of the block 102 would include defined edges such as those of the block 102 in image 100a. However, after the post-render motion blur takes place, the edges 104 of the block 102 will be feathered, blurred, or smeared to simulate how a traditional camera shutter would capture motion. As described above, this operation makes the animation of images 100a, 100b, and 100c seems smoother and more realistic to the human eye.

Note that in a simple case with a single object traveling in a linear direction, vector blurring may perform adequately. However, more complex scenes may involve many different CGI characters with many moving parts, each moving independent of the other. Scenes may be complicated by visual environmental effects, and complex character interactions. For example, in a scene where two large CGI characters are fighting in the ocean, the pixel motion between subsequent frames may not be linear, and as arms and legs rapidly interact with each other, traditional vector blurring may bleed from one character to another and/or may produce incomplete results.

Figure 2A:
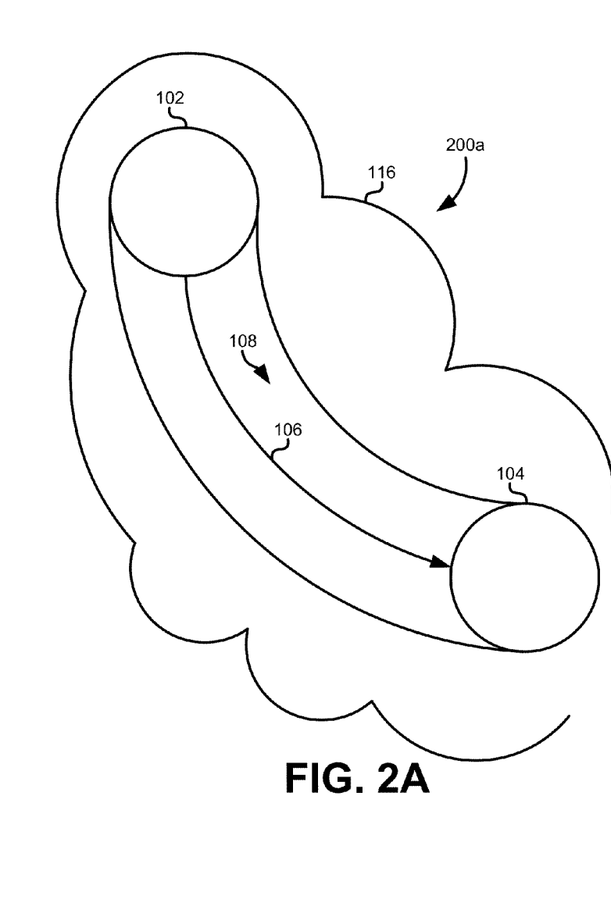
FIGS. 2A-B illustrate the error inherent in using vector pass motion blur with environmental effects, according to some embodiments.
Figure 2B:
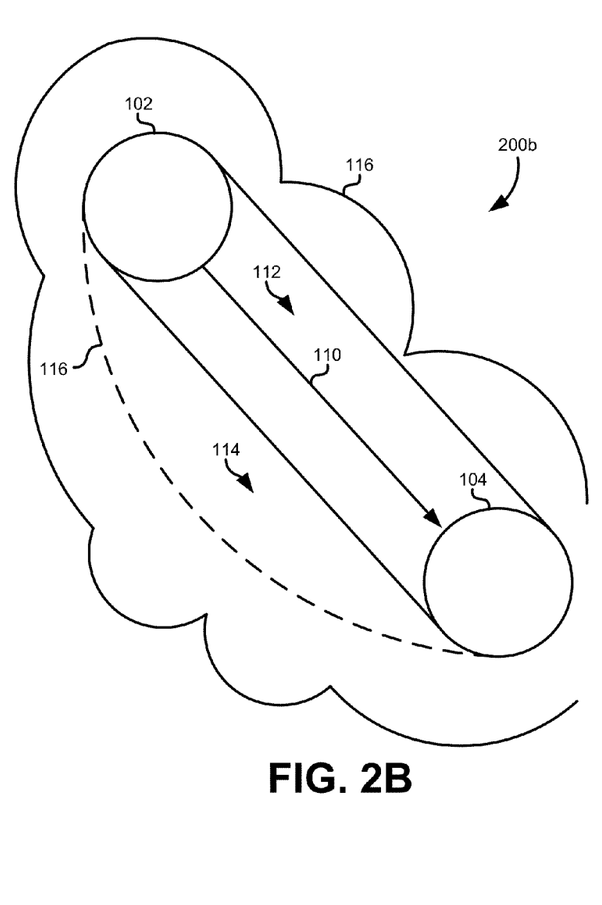

FIGS. 2A-B illustrate the cut out error inherent in using vector pass post motion blur with environmental effects, according to some embodiments. Generally, individual characters or objects in a scene may be rendered separately. In order to render an environmental effect, the effect renderer needs to know the position of the characters or objects in the scene so that the effect can properly interact with the characters/objects. For example, rain should land on or roll off of a character, and fog should swirl behind a moving object. In order to create a cut out for the object, a deep image may be provided for rendering the effect.

As used herein, the term "deep image" may broadly refer to an image output of a renderer that includes position information for each sample for each pixel in the image. In some cases, the deep image provided for rendering the effect may be simplified in that the image includes only opacity and depth information, and need not include color information. This type of image may be referred to herein as an "effects holdout image." In order to create a proper cut out for the effect, the effects holdout image will be motion blurred by the renderer. Generally, a blurred image will be larger than a non-blurred image, therefore the cutout in the effect needs to match the final blurred image that will be inserted into the scene within the effect. However, because color information need not be present in the effect holdout image, the renderer does not need to render lighting, specular characteristics, shading, reflections, textures, and/or the like, that would normally be present in a full render of an object. Therefore, performing a motion blur in absence of the color information can be done relatively quickly. By way of comparison, an effect holdout image that has been motion blurred can be generated in a matter of minutes, compared to a motion blurred beauty image with color that would take hours or even days to render completely with motion blur.

In a simplified example, FIG. 2A illustrates a diagram 200A of an object moving from a first position 102 to a second position 104. Note that the direction of motion 106 is not linear, but rather follows an arc path. For this example, it may be assumed that the motion blur as calculated by the renderer in the effect holdout image will produce a cutout 108 that roughly follows the path of the object from the first position 102 to the second position 104. During compositing, the effect 116 (e.g. fog) can work around the object shape of the cutout 108.

Next consider FIG. 2B, which illustrates a cutout that may be generated using traditional vector blur calculations. The vector pass that is provided by the renderer would determine that the average direction of motion 110 is represented by a linear vector pointing from the first position 102 to the second position 104. Therefore, the cutout 108 for the effect will be different from a position of the blurred image 112, because a different process was used to generate the cutout 108 than was used to generate the blurred image 112. Note that when the motion blurred image 112 is inserted into the scene with the effect 116, there will be a void 114 where the cutout 108 is not filled by the blurred image 112.

Figure 3:
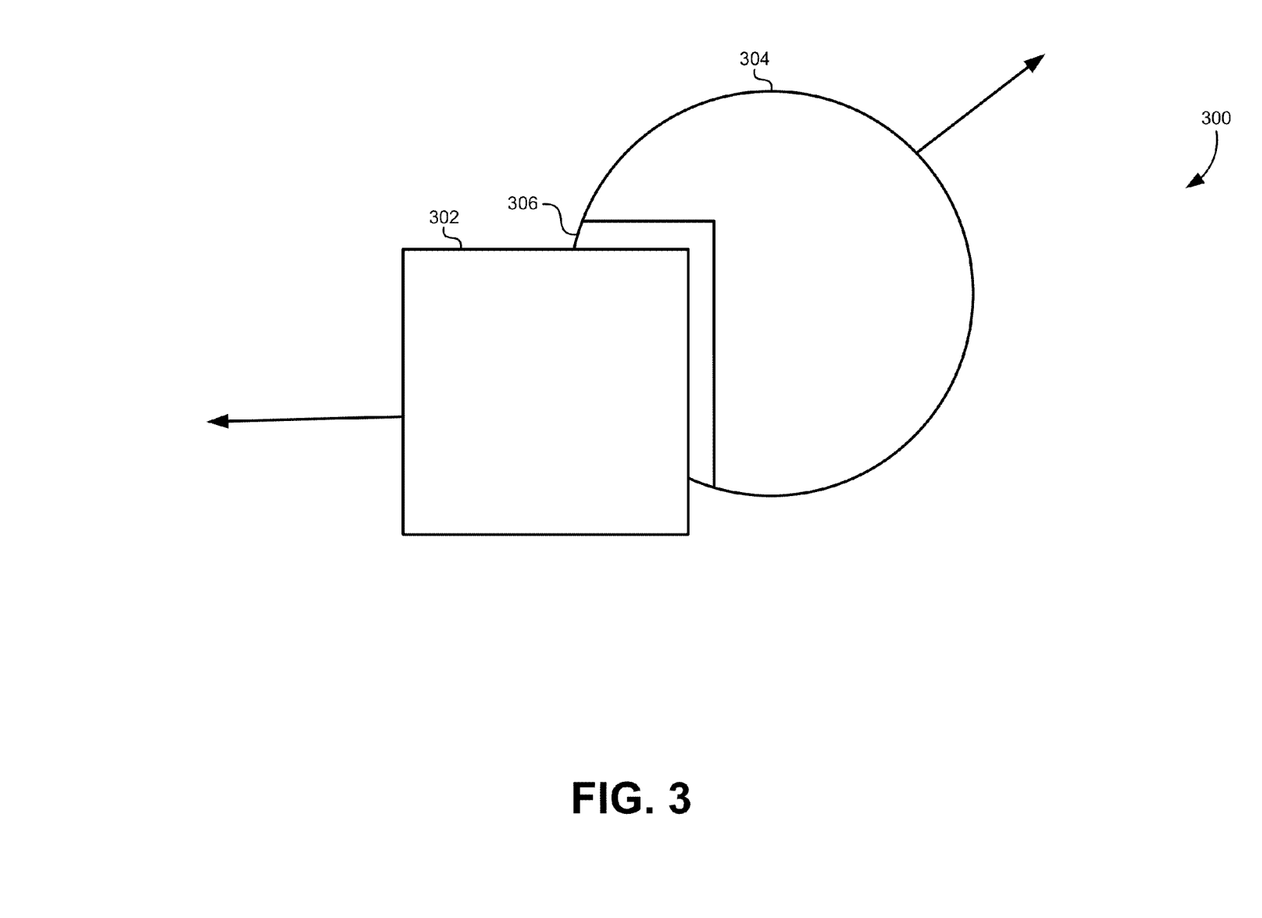
FIG. 3 illustrates two overlapping objects prior to post-render motion blur, according to one embodiment.

FIG. 3 illustrates two overlapping objects prior to post-render motion blur, according to one embodiment. Another problem with vector motion blur is that overlapping objects in motion may be blurred into each other by the motion vector blur. In this example, object 302 may be moving to the left, while object 304 may be moving to the upper right. The blur of each object around their boundaries may tend to blur into the other object in areas where they overlap 306. Using any known post-render motion blurring technique would generally require that this area be cleaned up by hand by a graphic artist on a frame-by-frame basis. This is generally a very time-consuming activity that becomes infeasible when the number of affected scenes becomes large.

Figure 4:
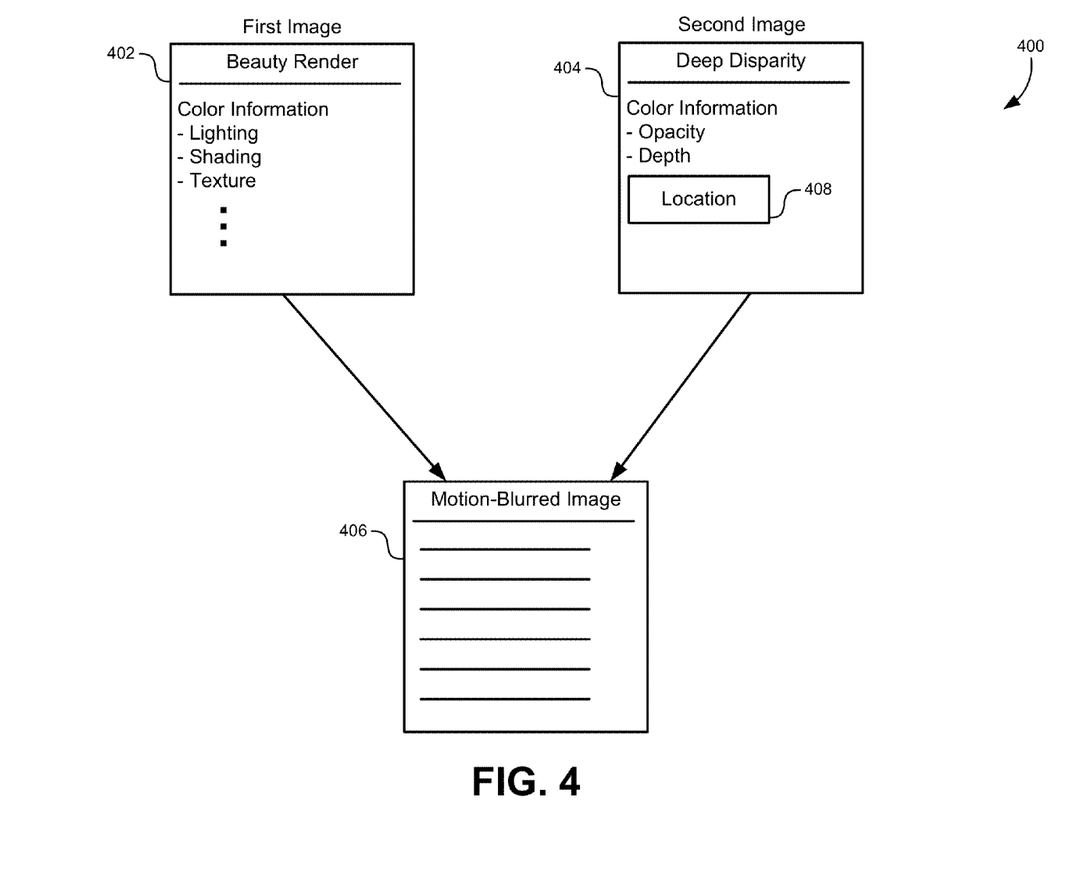
FIG. 4 illustrates a block diagram of post-render motion blur using two rendered images, according to one embodiment.

FIG. 4 illustrates a block diagram of post-render motion blur using two rendered images, according to one embodiment. Two images of an object can be provided by the renderer: (1) a first image 402, or beauty render, that includes a fully rendered image of the object that includes color, but that is not motion blurred; and (2) a second image 404—or effects holdout image—that is motion blurred. In these embodiments, second image 404 may also include additional information. The second image may also include location information 408. The location information 408 may specifically include the location of where the geometry represented by the pixel was on the screen before the motion blur operation was performed by the renderer. In some embodiments, each pixel may include a number of samples, and the second image 404 could store the screen coordinates for each sample from the non-blurred render whether or not that sample could be seen by the camera in the non-blurred render. By way of example, each pixel may include multiple samples depending on the sample alias settings of the renderer, with typical settings being a 7×7 or a 9×9 array of samples.

In some embodiments, the second image 404 may include two channels that store the X and Y normalized screen coordinates of where the sample existed within the non-blurred beauty render. In some embodiments, these values may be stored in the red and green channel of a single color attribute. This provides the advantage that the data can be visually inspected using standard image viewing tools. The second image 404 may be referred to herein as a "deep disparity image" as the second image 404 is deep by including multiple samples per pixel, and encodes disparity by referencing an original location of each sample before the motion blur. As described above, because the second image 404 does not include a full-color render of the object, the second image 404 can be rendered in a fraction of the time that it takes to render the beauty image, or first image 402.

The first image 402 may include all the color information that will be included in the final view of the character or object. Note that in some embodiments, the first image 402 may include additional information, but the first image 402 generally will not be motion blurred. The first image 402 may be rendered in considerably less time than it would take to render the beauty image to include the motion blur. Additionally, the renderer can produce the first image 402 and the second image 404 with the location information 408 much more efficiently than the renderer can produce a beauty image that has been motion blurred.

After the renderer has provided the first image 402 and the second image 404, there is now enough information available for a post-render process to generate a blurred image. The first image 402 contains the fully-rendered color information for the object, while the second image 404 includes a motion blurred version of the object with reference to the original sample locations. Therefore, some embodiments may use the pre-blur information for each sample in the second image 404 to find a color at a corresponding location in the first image 402. The samples in the second image 404, after being assigned the correct fully-rendered color, can now be combined to form a final blurred image that would be nearly the equivalent of a motion blurred beauty image provided by the renderer. Most importantly, the motion blurred image will fit within the cutout provided by the second image and generated by the environmental effect. This can eliminate the voids around the character in a scene as was illustrated in FIG. 3.

Figure 5:
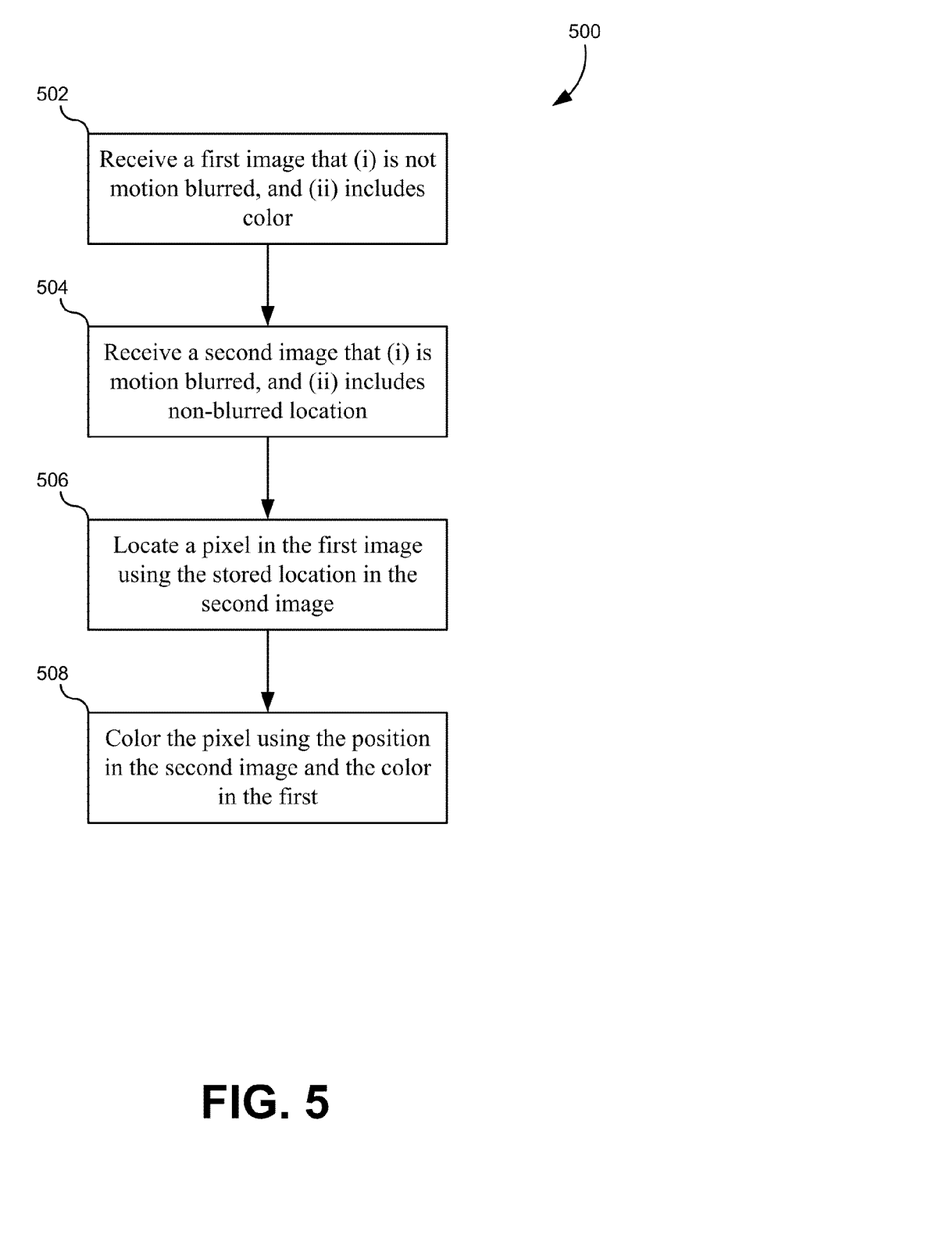
FIG. 5 illustrates a flowchart of a method for applying a post-render motion blur to an object, according to one embodiment.

FIG. 5 illustrates a flowchart of a method for applying a post-render motion blur to an object, according to one embodiment. The method may include receiving a first image of the object (502). In some embodiments, the first image is not motion blurred, and the first image includes a first pixel and rendered color information for the first pixel. Note that in some embodiments, each pixel in the first image will include a plurality of samples, and the color information may be stored for each of the plurality of samples. In other embodiments, each pixel in the first image may store a single color for the pixel. Although this method recites only a first pixel, it will be understood that the first pixel may be representative of many other pixels in the first image. As described above, the first image may be a beauty image that is fully color rendered, but not motion blurred by the renderer.

The method may also include receiving a second image (504). According to some embodiments, the second image may be motion blurred, and may include a second pixel. Additionally, the second image may include location information of the second pixel before the second image was motion blurred. The second image may represent an effects holdout image for use in generating an effect. In some embodiments, the location information may be represented as an X and Y normalized screen space coordinate set. For example, the X and Y coordinates could be values between '0' and '1' with (0, 0) being the bottom left corner of the display and (1, 1) being the top right corner of the display. In some embodiments, the second image will be motion blurred by the renderer. Additionally, the second image need not include rendered color information.

The method may further include locating the first pixel in the first image using the location of the second pixel before the second image was motion blurred (506). The method may additionally include coloring the second pixel using the rendered color information for the first pixel (508). In some embodiments, these operations may be performed for each pixel in the second image. For example, the process could loop through every pixel in the second image. Within each pixel, the process could loop through each deep sample and recolor it by reading the stored XY screen coordinates, multiplying the coordinates by the resolution of the first image to find the pixel coordinates, and then reading the color of the first image at that given pixel.

As used herein, the phrase "coloring the second pixel" should be broadly construed to mean associating the color extracted from the first image with the position of the pixel in the second image. In some embodiments, the color information from the first image can be simply stored in the second image. In other embodiments, the color information may be used to create a new image stored in a new location. This method can also apply to pixels with a single color as well is deep images where the pixels include multiple samples. Once all of the deep samples have been recolored, they can be composited together to yield a two-dimensional blurred image. This may be done from furthest and nearest in a standard deep-to-image operation.

Figure 6:
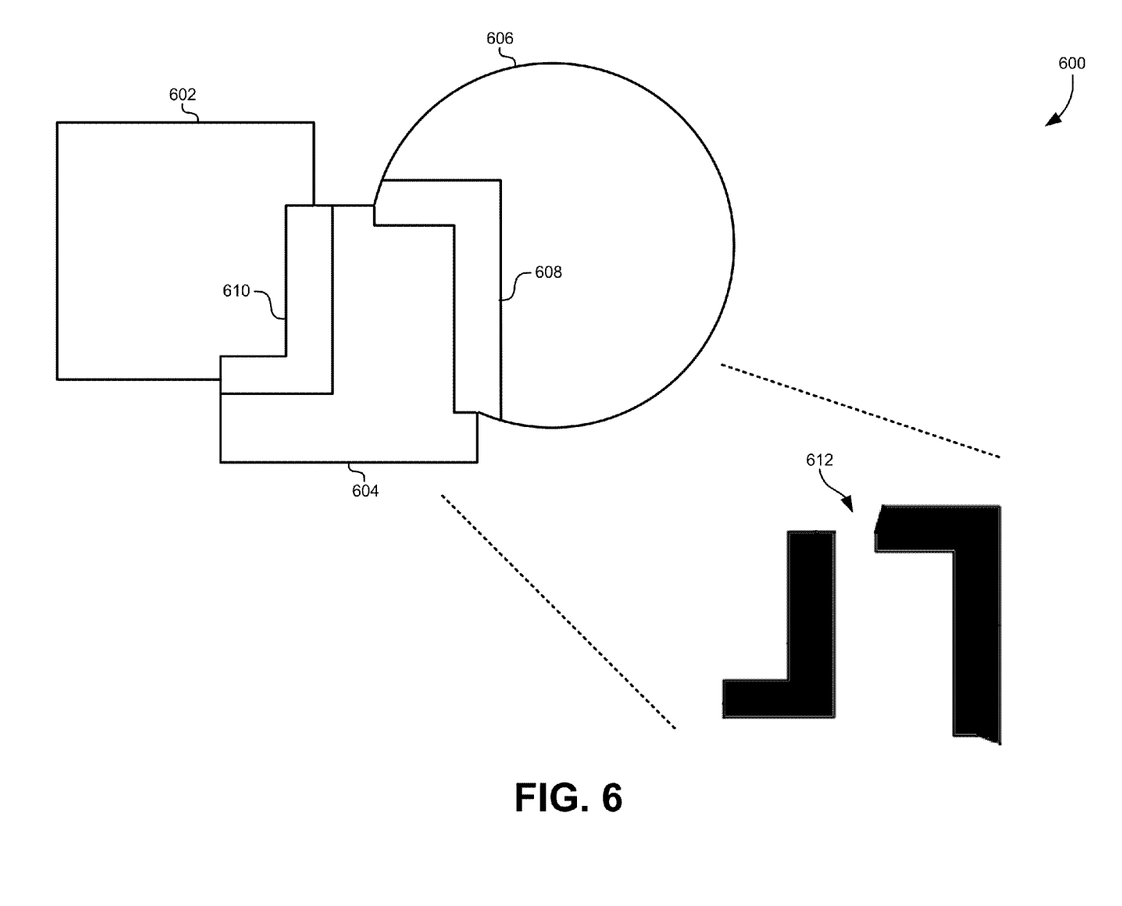
FIG. 6 illustrates a mask generated by occlusion information, according to one embodiment.

FIG. 6 illustrates a mask generated by occlusion information, according to one embodiment. The method of performing a post-render motion blur described in FIG. 5 can be extended to compensate for occlusion effects. A sample in a pixel may be occluded if there is anything between the pixel and the camera in the second image prior to being motion blurred. To determine if a sample in a pixel is occluded, the process can draw an occlusion ray back to the camera and determine whether any intersections with other objects were encountered. Generally, if a pixel is occluded, is very likely that the motion blurred image generated by the method of FIG. 5 may be incorrect. On the other hand, if the pixel is not occluded, it is very likely that the motion blurred image generated by the method of FIG. 5 is correct.

By way of example, FIG. 6 illustrates object 606 that is occluded by object 604. Similarly, object 604 is occluded by object 602. Pixels near the boundaries of each object may still be incorrectly blurred using the methods above. This incorrect blurring may cause objects to bleed into one another in a way that can be visually confusing. In order to correct this problem, additional information can be included in the second image along with the location information. This additional information can include an indication of which pixels were occluded in the non-blurred image.

In FIG. 6, areas around image boundaries, such as area 608 and area 610 may be occluded in the non-blurred image. Area 608 and area 610 may be designated as a set of pixels 612 where occlusion problems may exist and the motion blur may be incorrect. It should be noted that area 608 and area 610 are merely exemplary and greatly simplified in order to illustrate the concept of occlusion correction. The actual set of pixels that are occluded may be more unique and complicated in shape. It should also be noted that occlusion problems can exist in areas other than the boundaries of overlapping objects. For example, a single object may be rotating or turning such that some pixels are occluded by the object itself as it rotates away from the camera.

Figure 7:
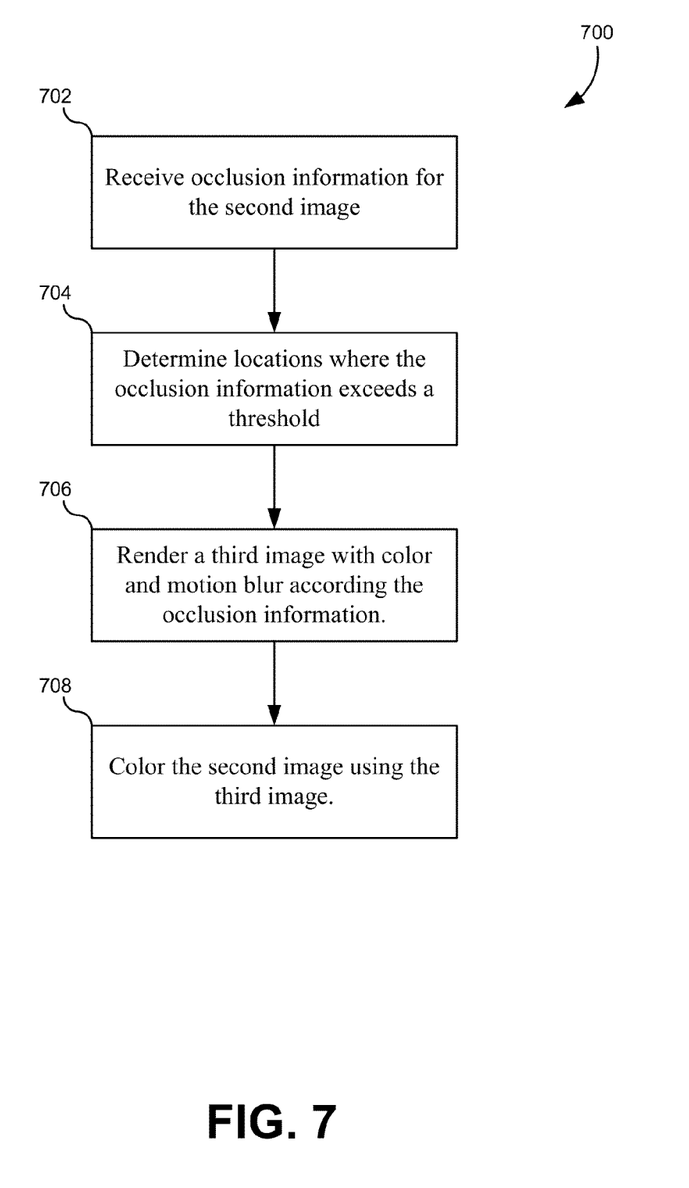
FIG. 7 illustrates a flowchart of a method for correcting for camera occlusion, according to one embodiment.

In order to generate correctly blurred images at occluded areas, a process may use the included pixels as an input to the renderer to generate an additional image that fully color renders and motion blurs only the selected portions of the image as specified by the set of pixels 612. FIG. 7 illustrates a flowchart 700 of a method for correcting for camera occlusion, according to one embodiment. The method may include receiving the second image of the object, where the second image further includes occlusion information indicating whether the second pixel is visible to the camera location when rendering the second image before motion blur (702). In some embodiments, the occlusion information may be stored as a '1' or '0' in the blue channel of a color attribute for each sample in the deep second image. This may provide the advantage that the occlusion areas may be visually displayed in traditional image viewing tools.

The method may also include determining that the occlusion information exceeds a threshold amount for each pixel in the second image (704). For binary occlusion data, the threshold may simply be any value greater than '0' or less than '1', depending on how the occlusion information is represented. In some embodiments, the binary results of each sample within a pixel may be averaged together or otherwise combined to generate a value between '0' and '1'. In this case, the threshold may be represented by values such as 0.01, 0.05, 0.1, 0.2, 0.5, 0.75, and/or the like. The second image may be analyzed to identify each pixel where the threshold is exceeded to form a set of pixels as an input to the renderer.

In some embodiments, no additional rendering may be needed, and the set of pixels may be used by graphic artists to identify areas of the image that need to be corrected by hand or by some other process. Note that in many cases, the original motion blurring, while not technically correct, was sufficient because of rough uniformity in the original image that was being recolored. For example, motion of a red robot could tolerate a certain level of blurring error. However, in more complicated scenes, these motion blurring errors may cause visual artifacts during the recoloring process, which could need to be corrected by hand.

In some embodiments, an additional image may be rendered in order to automatically correct these occlusion error areas without needing to repaint the images by hand. The method may additionally include rendering a third image of the object that includes color and motion blur for each pixel designated by the set of pixels identified above (706). In other words, only a small portion of the image needs to be fully color rendered and motion blurred by the renderer. In actual practice, it is typical that less than 5% of an object would need to be rendered in order to correct for occlusion problems using this method. Because such a small portion of the object needs to be fully color rendered and motion blurred by the renderer, these operations can be performed in much less time than would normally be required to fully color render and motion blur the entire image with a renderer.

Using the results of the partial-image rendering described above, the method may further include coloring the second image using the third image (708). Because the occlusion value is stored in each the sample of the second image, this information can be used in the recoloring stage. The contribution of any of occluded samples can be removed prior to recombining the samples to generate a single color. The color from the occluded samples can be replaced by the colors from the rendered third image that includes the correct motion blurred colors.

The methods described above for performing a post-render motion blur that compensates for occlusion errors has been described to generate a single image from a single camera view. However, these methods can be extended to generate a second image from a second camera view. Many modern motion pictures and video games offer stereo 3-D versions that can be viewed by 3-D televisions or watched with the aid of 3-D glasses.

To create stereo 3-D scenes, two sets of images need to be generated: one from a left eye camera and one from a right eye camera. Traditionally, two complete beauty renders needed to be generated by the renderer, one corresponding to a left eye camera and the other corresponding to a right eye camera. This meant that generating a stereo 3-D movie would take approximately twice as much rendering time as would normally be required.

The embodiments described herein can be leveraged to generate stereo 3-D image pairs while only requiring a single beauty render. The first and second images described above may be rendered and motion blurred using a single camera, such as the left eye camera. It will be understood that the first and second images described above may also be rendered using a right eye camera.

Figure 8:
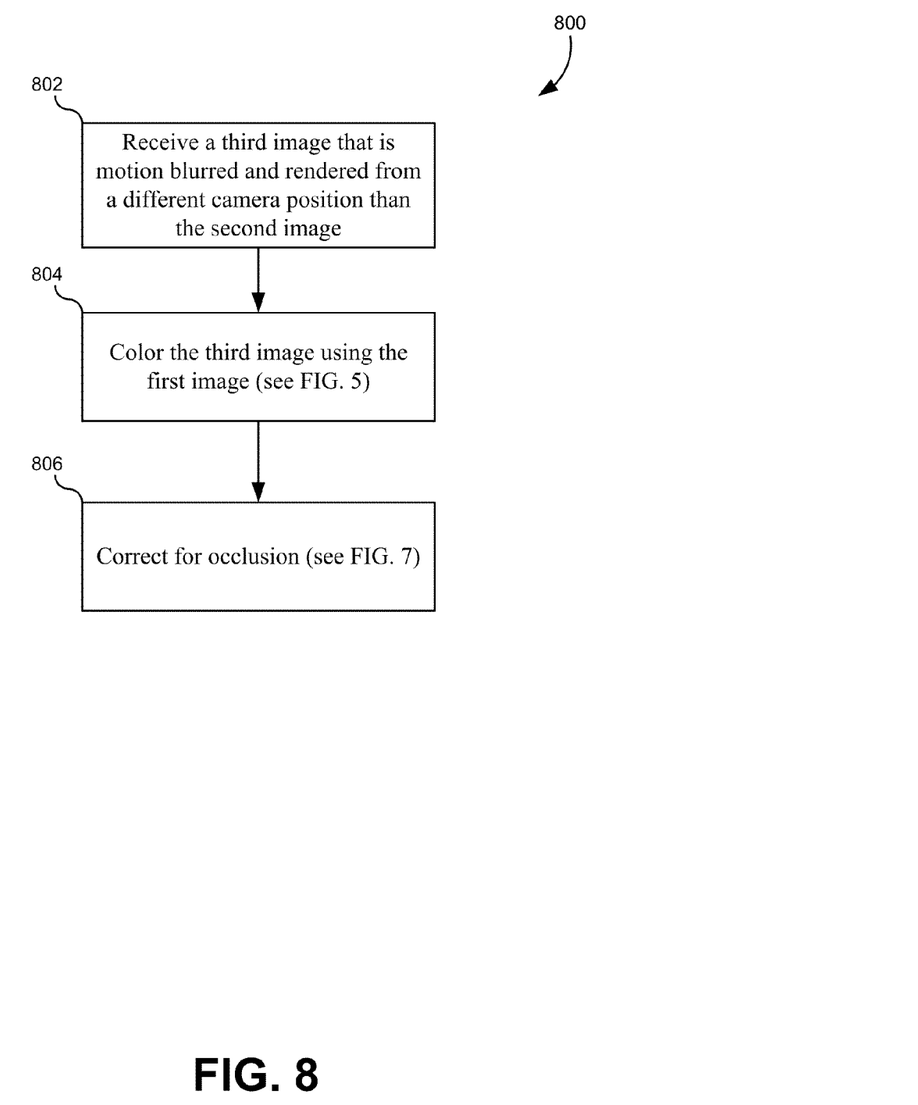
FIG. 8 illustrates a flowchart of a method for generating stereo 3-D images using post-render motion blur, according to one embodiment.

FIG. 8 illustrates a flowchart 800 of a method for generating stereo 3-D images using post-render motion blur, according to one embodiment. The method may include receiving a third image of the object from the renderer (802). In some embodiments, the third image of the object may be very similar to the second image of the object in that it is motion blurred and need not include color information. In other words, the third image of the object may represent another deep disparity image that can be used as an effects holdout image. The third image of the object may also include location information for the pixels prior to being motion blurred as was described above for the second image. However, the third image may be rendered from a camera position that is different from the camera position of the second image. For example, the second image may be rendered from a left eye camera while the third image can be rendered from the right eye camera. Because the second and third images include the position information, while the first image (beauty render) includes the color information, the first image can be used to color both the second and third images and generate a stereo 3-D image pair.

Therefore, the method may additionally include coloring the third image using the first image (804), and correcting for occlusion errors (806). Each of these operations may be performed in accordance with the descriptions and/or examples found in the rest of this disclosure.

It should be appreciated that the specific steps illustrated in FIGS. 5, 7, and 8 provide particular methods of performing a post-render motion blur, along with occlusion error correction and stereo 3-D image generation according to various embodiments. Other sequences of steps may also be performed according to alternative embodiments. For example, alternative embodiments of the present invention may perform the steps outlined above in a different order. Moreover, the individual steps illustrated in FIGS. 5, 7, and 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
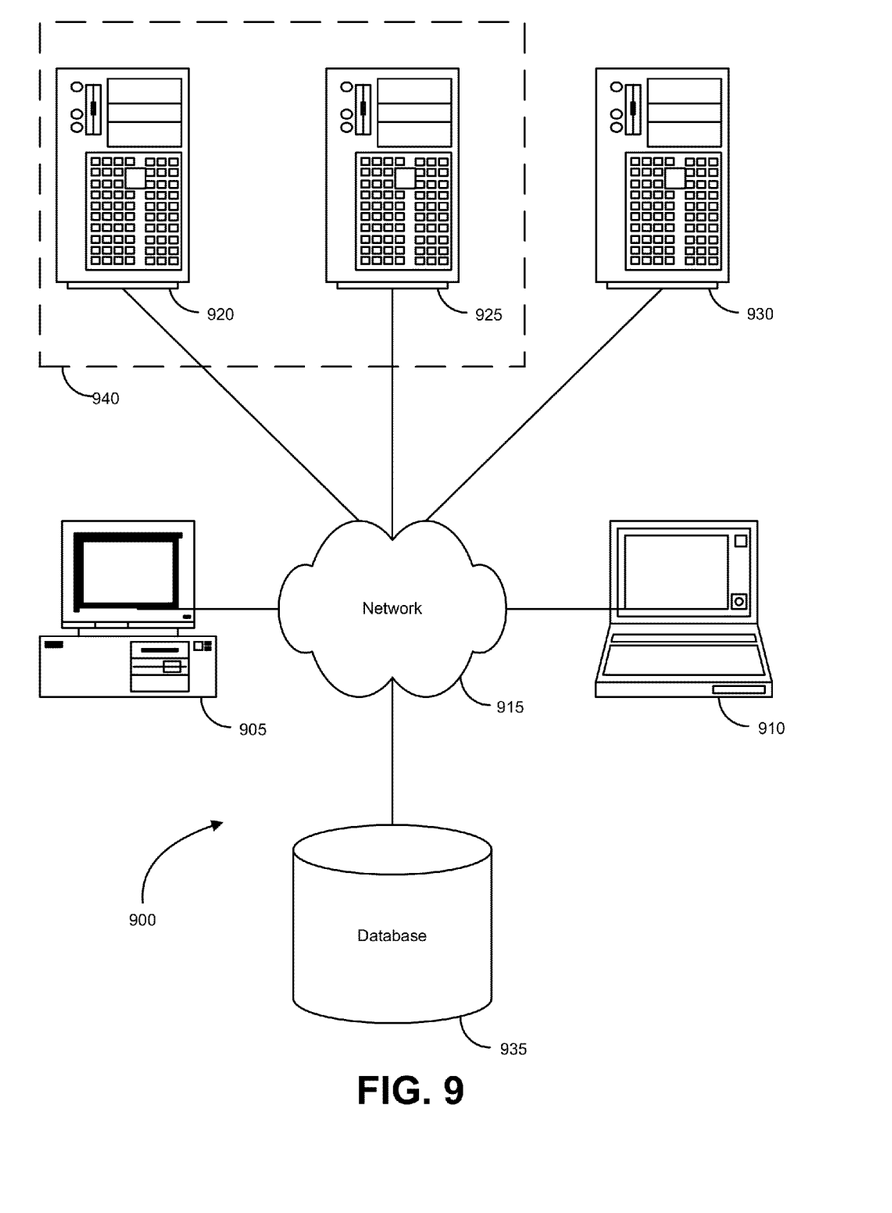
FIG. 9 illustrates a block diagram of components of an exemplary operating environment in which various embodiments of the present invention may be implemented.

Each of the embodiments disclosed herein may be implemented in a special-purpose computer system. FIG. 9 is a block diagram illustrating components of an exemplary operating environment in which various embodiments of the present invention may be implemented. The system 900 can include one or more user computers 905, 910, which may be used to operate a client, whether a dedicated application, web browser, etc. The user computers 905, 910 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 905, 910 may also have any of a variety of applications, including one or more development systems, database client and/or server applications, and web browser applications. Alternatively, the user computers 905, 910 may be any other electronic device, such as a thin-client computer, Internet-enabled mobile telephone, and/or personal digital assistant, capable of communicating via a network (e.g., the network 915 described below) and/or displaying and navigating web pages or other types of electronic documents. Although the exemplary system 900 is shown with two user computers, any number of user computers may be supported.

In some embodiments, the system 900 may also include a network 915. The network may can be any type of network familiar to those skilled in the art that can support data communications using any of a variety of commercially-available protocols, including without limitation TCP/IP, SNA, IPX, AppleTalk, and the like. Merely by way of example, the network 915 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 920, 925, 930 which can be general purpose computers and/or specialized server computers (including, merely by way of example, PC servers, UNIX servers, mid-range servers, mainframe computers rack-mounted servers, etc.). One or more of the servers (e.g., 930) may be dedicated to running applications, such as a business application, a web server, application server, etc. Such servers may be used to process requests from user computers 905, 910. The applications can also include any number of applications for controlling access to resources of the servers 920, 925, 930.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 905, 910. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 905, 910.

In some embodiments, an application server may create web pages dynamically for displaying on an end-user (client) system. The web pages created by the web application server may be forwarded to a user computer 905 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 900 may also include one or more databases 935. The database(s) 935 may reside in a variety of locations. By way of example, a database 935 may reside on a storage medium local to (and/or resident in) one or more of the computers 905, 910, 915, 925, 930. Alternatively, it may be remote from any or all of the computers 905, 910, 915, 925, 930, and/or in communication (e.g., via the network 920) with one or more of these. In a particular set of embodiments, the database 935 may reside in a storage-area network ("SAN") familiar to those skilled in the art. Similarly, any necessary files for performing the functions attributed to the computers 905, 910, 915, 925, 930 may be stored locally on the respective computer and/or remotely, as appropriate. In one set of embodiments, the database 935 may be a relational database, such as Oracle 10g, that is adapted to store, update, and retrieve data in response to SQL-formatted commands.

Figure 10:
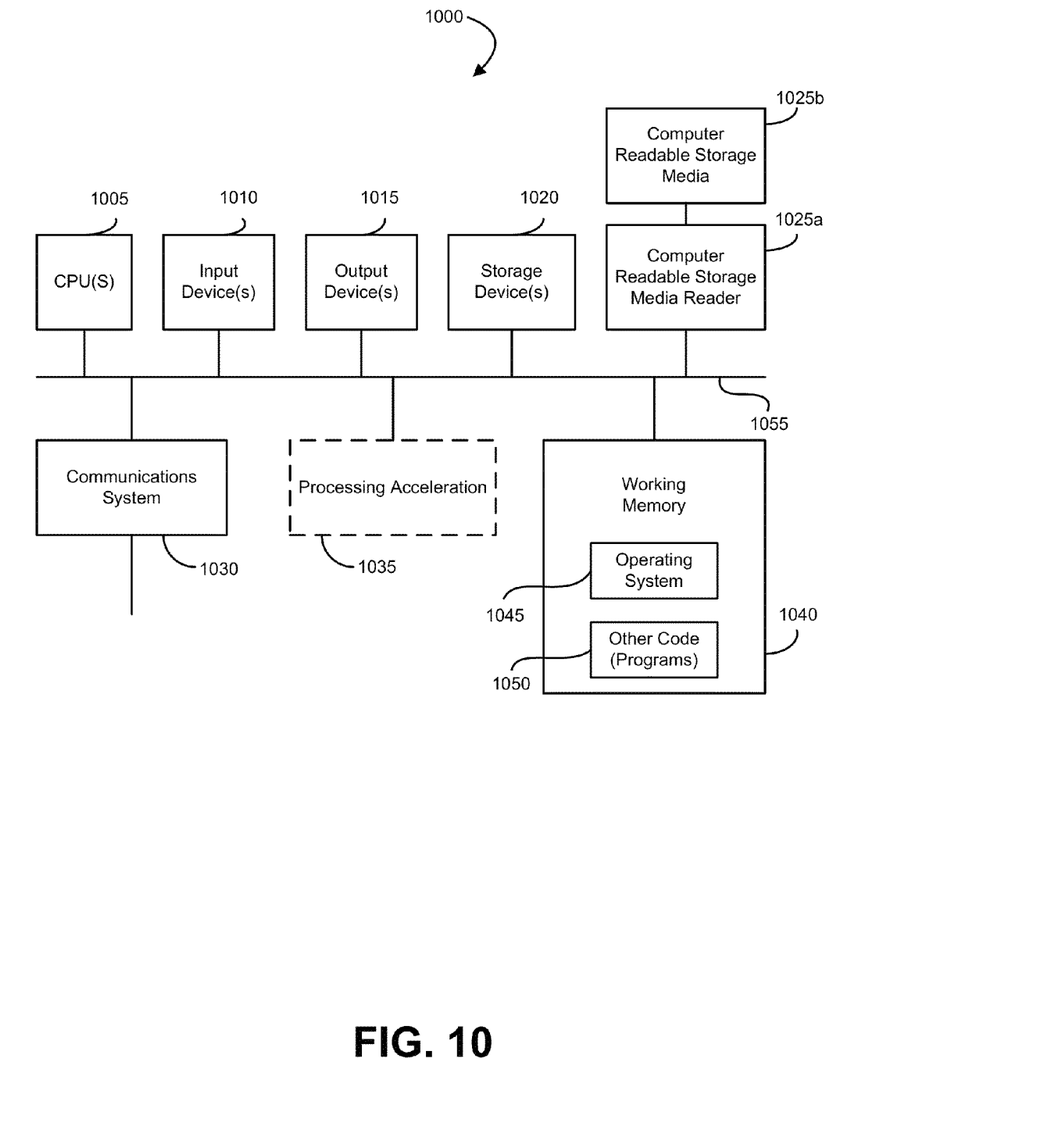
FIG. 10 illustrates a block diagram of an exemplary computer system in which embodiments of the present invention may be implemented.

FIG. 10 illustrates an exemplary computer system 1000, in which various embodiments of the present invention may be implemented. The system 1000 may be used to implement any of the computer systems described above. The computer system 1000 is shown comprising hardware elements that may be electrically coupled via a bus 1055. The hardware elements may include one or more central processing units (CPUs) 1005, one or more input devices 1010 (e.g., a mouse, a keyboard, etc.), and one or more output devices 1015 (e.g., a display device, a printer, etc.). The computer system 1000 may also include one or more storage device 1020. By way of example, storage device(s) 1020 may be disk drives, optical storage devices, solid-state storage device such as a random access memory ("RAM") and/or a read-only memory ("ROM"), which can be programmable, flash-updateable and/or the like.

The computer system 1000 may additionally include a computer-readable storage media reader 1025a, a communications system 1030 (e.g., a modem, a network card (wireless or wired), an infra-red communication device, etc.), and working memory 1040, which may include RAM and ROM devices as described above. In some embodiments, the computer system 1000 may also include a processing acceleration unit 1035, which can include a DSP, a special-purpose processor and/or the like.

The computer-readable storage media reader 1025a can further be connected to a computer-readable storage medium 1025b, together (and, optionally, in combination with storage device(s) 1020) comprehensively representing remote, local, fixed, and/or removable storage devices plus storage media for temporarily and/or more permanently containing computer-readable information. The communications system 1030 may permit data to be exchanged with the network 1020 and/or any other computer described above with respect to the system 1000.

The computer system 1000 may also comprise software elements, shown as being currently located within a working memory 1040, including an operating system 1045 and/or other code 1050, such as an application program (which may be a client application, web browser, mid-tier application, RDBMS, etc.). It should be appreciated that alternate embodiments of a computer system 1000 may have numerous variations from that described above. For example, customized hardware might also be used and/or particular elements might be implemented in hardware, software (including portable software, such as applets), or both. Further, connection to other computing devices such as network input/output devices may be employed. Software of computer system 1000 may include code 1050 for implementing embodiments of the present invention as described herein.

Each of the methods described herein may be implemented by a computer system, such as computer system 1000 in FIG. 10. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computed without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of applying a post-render motion blur to an object, the method comprising:
   receiving a first image of the object, wherein:
      the first image is not motion blurred; and
      the first image comprises:
         a first pixel; and
         rendered color information for the first pixel;
   receiving a second image of the object, wherein:
      the second image is motion blurred; and
      the second image comprises:
         a second pixel; and
         a location of the second pixel before the second image was motion blurred;
   locating the first pixel in the first image using the location of the second pixel before the second image was motion blurred; and
   coloring the second pixel using the rendered color information for the first pixel.

2. The method of claim 1 wherein the second image further comprises occlusion information indicating whether the second pixel is visible to a camera location when rendering the second image.

3. The method of claim 2 further comprising:
   determining that the occlusion information exceeds a threshold amount for the second pixel in the second image;
   rendering a third image of the object that includes color and motion blur for the object at the second pixel; and
   using at least a portion of the third image to color the second image.

4. The method of claim 1 wherein the first image comprises a beauty render image.

5. The method of claim 1 wherein the second image comprises an effects holdout image.

6. The method of claim 1 wherein the second image does not include rendered color information.

7. The method of claim 1 wherein:
   the second pixel comprises a plurality of samples;
   the location of the second pixel before the second image was motion blurred comprises a plurality of locations corresponding to the plurality of samples;
   locating the first pixel in the first image comprises locating each of the plurality of samples in the first image; and
   coloring the second pixel using the rendered color information for the first pixel comprises:
      coloring each sample in the second pixel using a color from the first image; and
      compositing the plurality of samples to calculate a color for the second pixel.

8. The method of claim 1 further comprising:
   receiving a third image of the object, wherein:
      the third image is motion blurred;
      the third image includes pixel location information prior to being motion blurred;
      the second image is rendered using a first camera position; and
      the third image is rendered using a second camera position; and
   coloring the third image using the first image, wherein the second image and the third image are stereo images for a three-dimensional presentation.

9. A computer-readable memory comprising a sequence of instructions which, when executed by one or more processors, causes the one or more processors to apply a post-render motion blur to an object by:
  receiving a first image of the object, wherein:
    the first image is not motion blurred; and
    the first image comprises:
      a first pixel; and
      rendered color information for the first pixel;
  receiving a second image of the object, wherein:
    the second image is motion blurred; and
    the second image comprises:
      a second pixel; and
      a location of the second pixel before the second image was motion blurred;
  locating the first pixel in the first image using the location of the second pixel before the second image was motion blurred; and
  coloring the second pixel using the rendered color information for the first pixel.

10. The computer-readable memory according to claim 9 wherein the second image further comprises occlusion information indicating whether the second pixel is visible to a camera location when rendering the second image.

11. The computer-readable memory according to claim 10 wherein the instructions further cause the one or more processors to apply a post-render motion blur to an object by:
  determining that the occlusion information exceeds a threshold amount for the second pixel in the second image;
  rendering a third image of the object that includes color and motion blur for the object at the second pixel; and
  using at least a portion of the third image to color the second image.

12. The computer-readable memory according to claim 9 wherein the first image comprises a beauty render image.

13. The computer-readable memory according to claim 9 wherein the second image comprises an effects holdout image.

14. The computer-readable memory according to claim 9 wherein the second image does not include rendered color information.

15. The computer-readable memory according to claim 9 wherein:
  the second pixel comprises a plurality of samples;
  the location of the second pixel before the second image was motion blurred comprises a plurality of locations corresponding to the plurality of samples;
  locating the first pixel in the first image comprises locating each of the plurality of samples in the first image; and
  coloring the second pixel using the rendered color information for the first pixel comprises:
    coloring each sample in the second pixel using a color from the first image; and
    compositing the plurality of samples to calculate a color for the second pixel.

16. The computer-readable memory according to claim 9 wherein the instructions further cause the one or more processors to apply a post-render motion blur to an object by:
  receiving a third image of the object, wherein:
    the third image is motion blurred;
    the third image includes pixel location information prior to being motion blurred;
    the second image is rendered using a first camera position; and
    the third image is rendered using a second camera position; and
  coloring the third image using the first image, wherein the second image and the third image are stereo images for a three-dimensional presentation.

17. A system comprising:
one or more processors; and
a memory communicatively coupled with and readable by the one or more processors and comprising a sequence of instructions which, when executed by the one or more processors, cause the one or more processors to apply a post-render motion blur to an object by:
  receiving a first image of the object, wherein:
    the first image is not motion blurred; and
    the first image comprises:
      a first pixel; and
      rendered color information for the first pixel;
  receiving a second image of the object, wherein:
    the second image is motion blurred; and
    the second image comprises:
      a second pixel; and
      a location of the second pixel before the second image was motion blurred;
  locating the first pixel in the first image using the location of the second pixel before the second image was motion blurred; and
  coloring the second pixel using the rendered color information for the first pixel.

18. The system of claim 17 wherein the instructions further cause the one or more processors to apply a post-render motion blur to an object by:
  receiving a third image of the object, wherein:
    the third image is motion blurred;
    the third image includes pixel location information prior to being motion blurred;
    the second image is rendered using a first camera position; and
    the third image is rendered using a second camera position; and
  coloring the third image using the first image, wherein the second image and the third image are stereo images for a three-dimensional presentation.

19. The system of claim 17 wherein:
the second pixel comprises a plurality of samples;
the location of the second pixel before the second image was motion blurred comprises a plurality of locations corresponding to the plurality of samples;
locating the first pixel in the first image comprises locating each of the plurality of samples in the first image; and
coloring the second pixel using the rendered color information for the first pixel comprises:
  coloring each sample in the second pixel using a color from the first image; and
  compositing the plurality of samples to calculate a color for the second pixel.

20. The system of claim 17 wherein
the second image further comprises occlusion information indicating whether the second pixel is visible to a camera location when rendering the second image; and
the instructions further cause the one or more processors to apply a post-render motion blur to an object by:
  determining that the occlusion information exceeds a threshold amount for the second pixel in the second image;
  rendering a third image of the object that includes color and motion blur for the object at the second pixel; and
  using at least a portion of the third image to color the second image.

* * * * *

UNITED STATES PATENT AND TRADEMARK OFFICE
CERTIFICATE OF CORRECTION

| | | |
|---|---|---|
| PATENT NO. | : 9,025,902 B2 | Page 1 of 1 |
| APPLICATION NO. | : 14/036664 | |
| DATED | : May 5, 2015 | |
| INVENTOR(S) | : Victor Schutz and Patrick Conran | |

It is certified that error appears in the above-identified patent and that said Letters Patent is hereby corrected as shown below:

Title page

Item (74): Attorney, Agent or Firm,

Please delete "Kilpatrick Townend Stockton LLP"; and
Please insert --Kilpatrick Townsend Stockton LLP--.

Signed and Sealed this
First Day of September, 2015

Michelle K. Lee
*Director of the United States Patent and Trademark Office*